[11] 3,630,285

| [72] | Inventors | Edwin E. Claytor, Jr.; Loyd W. Jones, both of Tulsa, Okla. |
|---|---|---|
| [21] | Appl. No. | 39,868 |
| [22] | Filed | May 22, 1970 |
| [45] | Patented | Dec. 28, 1971 |
| [73] | Assignee | Amoco Production Company Tulsa, Okla. |

[54] ACIDIZING HIGH-TEMPERATURE WELLS
10 Claims, No Drawings

[52] U.S. Cl. ................................................. 166/300, 166/307
[51] Int. Cl. ................................................. E21b 43/27
[50] Field of Search ..................................... 166/281, 282, 300, 305 R, 307, 312; 252/8.55, 8.55 B, 8.55 C

[56] References Cited
UNITED STATES PATENTS

| 3,131,759 | 5/1964 | Slusser et al. ................. | 166/305 R |
| 2,059,459 | 11/1936 | Hund et al. ................... | 166/307 X |
| 2,863,832 | 12/1958 | Perrine ......................... | 252/8.55 C |
| 2,910,436 | 10/1959 | Fatt et al. ...................... | 252/8.55 C X |
| 3,033,784 | 5/1962 | Jones ............................. | 166/305 R |
| 3,285,341 | 11/1966 | Parker .......................... | 166/305 R X |
| 3,402,770 | 9/1968 | Messenger ..................... | 252/8.55 B X |

OTHER REFERENCES

Seymour, Keith M., Organic Chemistry, N.J., Englewood Cliffs, Prentice–Hall, 1961, pp. 104–106

*Primary Examiner*—Ian A. Calvert
*Attorneys*—Paul F. Hawley and Buell B. Hamilton ABSTRACT: A high-temperature earth formation is acidized by injecting down a well and into the formation a water-soluble ester of an organic carboxylic acid which forms a calcium salt which is also water-soluble. The formation should be at a temperature of at least about 200° F., and preferably at least about 300° F. Water may be injected before, after, or with the ester. The well is preferably shut-in after injecting the ester to permit more complete hydrolysis of the ester before the well is returned to its usual operation. Various combinations of esters or combinations of esters and free acids can be used. The ester may be injected as a solution in aqueous or nonaqueous solvents. Preferred esters are methyl formate and ethyl acetate.

ACIDIZING HIGH-TEMPERATURE WELLS

For many years, acids have been used to treat oil-bearing formations penetrated by wells. The purpose has been to dissolve the formations and increase the rate of flow of oil into the well or the rate of flow of oil-displacing fluids into the formation. The desirability of delaying the rate of reaction of the acid with the formation was recognized early and several techniques were proposed to slow the reaction rate. These included emulsifying the aqueous acid solutions in oil as proposed in U.S. Pats. Nos. 1,922,154 De Groote; 2,050,932 De Groote; 2,681,889 Menaul et al., and the like. The techniques included dissolving the acids in a nonaqueous solvent as described in U.S. Pat. Nos. 2,059,459 Hund et al.; 2,206,187 Herbsman; 2,863,832 Perrine; and 2,910,436 Fatt et al. They also included use of nonaqueous solutions of organic chemicals which released acids only upon contact with water, as suggested in U.S. Pat. Nos. 2,059,459 Hund et al., and 2,863,832 Perrine.

The processes using nonaqueous solutions or organic chemicals requiring contact with water have another advantage. Many of the organic chemicals are more soluble in oil than in water. Therefore, the acidizing process is delayed not only by the required reaction of the organic acid with water but also by the required transfer of the organic chemical from its nonaqueous solvent into the water in which it is less soluble than it is in the organic solvent. If the released acid is a weak organic acid, such as acetic acid as in the Perrine process, the acidizing action is still further delayed.

As wells have been drilled deeper into formations having higher temperatures, even the Perrine process permits acidizing to proceed further than is sometimes desired. Another problem which becomes very serious in deep high-temperature wells is corrosion of the well tubing by the acid.

An object of this invention is to acidize a formation penetrated by a well, the acidizing action extending into the formation to a great distance from the well. A more specific object is to provide an improved process for acidizing high-temperature formations. Another specific object is to provide a method which overcomes corrosion problems in acidizing high-temperature wells. Still other objects will be apparent to those skilled in the art from the following description and claims.

SUMMARY

In general, we accomplish the objects of our invention by injecting into the formation a water-soluble ester of an organic carboxylic acid which forms water-soluble calcium salts.

With esters, the principal problem is substantially opposite to that when using acidizing chemicals of the prior art. Under ordinary conditions, esters are very stable compounds of widespread natural occurrence in the presence of water. Even at temperatures near 200° F., hydrolysis of even the low molecular weight esters occurs at only a very slow rate. Thus, instead of the problem being one of too rapid an attack on the treated formations, the problem usually is that the reaction is too slow. Acids and bases are known to catalyze the hydrolysis of esters. However, limestone formations rapidly neutralize the catalytic effects of these materials. The limestone itself may have a slight catalytic effect. In one test, however, even in the presence of limestone, the hydrolysis of ethyl acetate proceeded to only a little over 10 percent in 4 hours at about 300° F. In this test, the ethyl acetate and water existed mostly as separate phases in a static system, the limestone being in the water. Under the circumstances, the controlling action may have been the transfer of ethyl acetate into the water at a rather limited interface rather than the hydrolysis rate itself. Flow through pores or even fractures in a formation provides a much greater interface between the ester and water and, therefore, a much better opportunity for this transfer.

As a practical matter, our process is effective only at high temperatures. The formation temperature should be at least about 200° F. and preferably at least about 250° F., even for the low molecular weight esters, such as ethyl acetate or methyl formate. The process is most advantageous at temperatures above about 300° F.

The ester must be at least slightly water-soluble if the hydrolysis is to proceed at a practical rate even at high temperatures. The solubility can be increased by adding a solvent such as isopropanol or other water-soluble alcohols, ketones, or the like, to water injected before, after, or together with the ester. The ester should dissolve at least to the extent of about one gram and preferably at least about 5 grams in 100 milliliters of water at formation temperature for our purposes. This usually means that neither the alcohol nor the acid should contain more than about five carbon atoms. There are a few exceptions, however. Preferably, the ester should be of methyl or ethyl alcohol and formic or acetic acid. This is because of the high water solubilities and rapid hydrolysis rates of these esters. A particularly desirable ester is methyl formate. Because of its low molecular weight and low price, it can be used to acidize limestone at a low cost per point of limestone dissolved.

The calcium salt of the acid portion of the ester must also be soluble in water so it can be removed from the formation. This places another limit on the acids which can be used. The calcium salts of all the lower aliphatic monocarboxylic acids are sufficiently soluble but this requirement excludes the use of polybasic acids such as oxalic acid. Others, such as maleic acid, can be used, although the solubility of their calcium salts may be near the lower limit. The calcium slat should have a water solubility of at least about 2 and preferably at least about 10 grams in 100 milliliters of water at formation temperature. Some acids, such as benzoic acid, form sufficiently soluble calcium salts but even the methyl esters are too insoluble in water for our purposes. The acids may contain groups such as the hydroxyl group in addition to the acid group. Glycolic acid is an example of such an acid which can be used. Neither the acid nor the alcohol portion of the ester should include halogen groups. This avoids problems of toxicity and difficulties with refinery catalysts.

The alcohol portion of the ester may be monohydric or polyhydric, such as ethylene glycol, glycerine, or the like, as long as the esters are sufficiently water soluble at formation temperatures. Partial esters of the polyhydric alcohols can be used, the unesterified hydroxyl groups serving to increase the water solubility of the ester.

The ester can be used in undiluted form. Preferably, however, it is diluted to cause the ester to occupy and treat a larger volume of the reservoir. The concentration of the ester in the solvent should be at least about 5 percent and preferably at least about 20 percent by volume in order to insure an effective degree of acidizing.

Few of the esters are sufficiently soluble in water at high temperatures for water alone to be used as the diluting solvent. Many of the esters, however, can be dissolved in a mixture of water and an alcohol such as isopropanol. Ordinarily, the diluent is a nonaqueous liquid such as an alcohol, ketone, or hydrocarbon. A low-cost solvent is a petroleum fraction such as kerosene. Petroleum fractions are available having high contents of aromatic hydrocarbons. These have the advantage of being very good solvents for paraffin and other organic deposits as well as for esters, and are preferred for this reason. In case of solubility problems, mixed solvents, such as hydrocarbons and alcohols can be used to dilute the esters. An advantage of using the undiluted ester or a solution of the ester in a hydrocarbon solvent to treat an oil well is that under these circumstances the ester has a greater tendency to go into the oil-bearing pores and acidize these pores rather than going into the water-bearing pores.

The esters themselves may be mixtures of esters, mixtures with other organic materials, or mixtures with each other and other organic chemicals. Technical grades of esters should ordinarily be used for economic reasons.

Mixtures of the esters with low molecular weight organic acids, such as acetic acid or formic acid, may be desirable in some cases. The free acid attacks the zone of the formation near the well where the highest permeability is desired while the esters acidize the formation at greater distances from the well. Mixtures with mineral acids, such as hydrochloric acid, can also be used if desired. Acids used with the esters have the advantage of increasing the rate of hydrolysis of the esters until the acids are neutralized by the formation.

If the ester is diluted with a nonaqueous solvent such as kerosene, the rate of transfer of the ester into the water phase will be decreased. Therefore, the previously mentioned technique of mixing alcohol or other solvents into water injected before, after, or with the ester, may be particularly desirable in the case of esters diluted with such nonaqueous solvents.

If the formation contains water, it is possible simply to inject the ester down a well and into the formation to be treated. The well is then shut-in for several hours to permit hydrolysis of the ester by the water in the formation. If the well is an oil-producing or water-producing well, the well is then returned to production. If the well is an injection well in an operation such as a water drive, gas drive, or the like, injection can then be resumed.

If the ester is injected in an aqueous solvent, there is less need for water in the formation since some water is introduced with the ester. If the ester is injected without dilution, or in a nonaqueous solvent, it is usually best to introduce water in addition to that naturally present in the formation. This water may be injected before, after, or with a nonaqueous ester solution. The water and ester may be introduced as single batches, alternated small batches, or emulsified. As previously mentioned, this extra water may contain an ester solvent to increase the rate of transfer of ester into the water phase. The separate water phase may also contain an acid such as hydrochloric acid, formic acid, acetic acid, or the like, to increase the formation permeability near the well bore and thus facilitate displacing the ester solution into the formation. The water phase may also contain hydroxyacetic acid, gluconic acid, ethylenediaminetetraacetic acid, their salts, or other scale-removing agents to aid in clearing the pore of the formation near the well. If an acid is used in the water, any unneutralized acid also helps to hydrolyze the ester if the water is injected before or with the extra solution. In very hot wells, where the hydrolysis rate of the ester is already fast enough, it may be advisable not to use free acid in the ester solution or in a separate water phase before or with the ester solution. In such cases, free acid can still be included in water following the ester or its solution. Another advantage of any injected water is the improved removal of calcium salts of the acid portion of the ester.

In very high-temperature wells, mixtures of esters such as methyl formate and butyl acetate can be used with advantage. The methyl formate is relatively highly water soluble and hydrolyzes relatively quickly. The butyl acetate is less water soluble and hydrolyzes more slowly. Thus, the methyl formate acidizes the formation near the well while the butyl acetate acidizes the formation farther from the well. When extra water is injected, at least some of the lower molecular weight ester may be included in this water.

When water is injected as a part of our process, one advantage of injecting the water first is that it cools the well. At the lower temperature, less ester hydrolysis takes place, so less acid is generated to corrode exposed metal parts, such as well tubing. One of the advantages of our process is that acid is introduced down the well and into the formation in a form which does not seriously corrode metal parts. The esters are inert, noncorrosive organic chemicals themselves. Hydrolysis takes place so slowly in any case that corrosion of well tubing and the like is not a serious problem. Use of cooling water ahead of the ester simply further reduces the corrosion.

Injected water also cools the formation. This is ordinarily undesirable since it slows the rate of hydrolysis of esters in the formation. However, as soon as the ester is injected into the formation and the well is shut-in, the temperature rather quickly returns to normal formation temperature or close to it. If the formation temperature is not much above about 200° F., the well may be left shut-in for several days to permit most of the ester to hydrolyze. At temperatures around 300° F., a shut-in period of about 24 hours may be adequate. At temperatures much above 300° F., the well may be returned to production as soon as the ester is injected. Even at these extreme temperatures, however, a shut-in period of at least an hour or two is generally helpful. Even if no shut-in time is used, much of the injected ester and water will remain in the formation and will be produced over a period of several days. Most of the ester remaining in the formation hydrolyzes during such periods. In order to insure efficient use of the ester, however, the well should be shut-in for at least a short time after the ester is injected.

Our process will be better understood from the following example. A well is completed in an oil-bearing limestone formation by cementing casing through the formation and perforating from 13,400 to 13,500 feet. The formation temperature is 310° F. In treating this formation in accordance with our process, a packer is run near the bottom of open-ended tubing. The packer is set at a depth of 13,380 feet in the well. First, 5,000 gallons of water is injected down the tubing and into the formation. This is followed by 10,000 gallons of a solution of methyl formate in an aromatic petroleum naphtha. The concentration of ester in the solutions is about 25 percent by volume. The ester solution is displaced down the tubing and into the formation 5,000 gallons of an inhibited 10 percent by weight acetic acid solution in water. This acid solution is, in turn, displaced out of the tubing and into the formation of 3,000 gallons of water. The well is then shut-in with part of the water standing in the tubing. After holding the well shut-in for 24 hours, it is reopened and produces oil at an increased rate.

The preflush with water cools the tubing and bottom of the well to decrease even further the small amount of hydrolysis of the ester in the tubing. This substantially eliminates corrosion, by the ester, of the tubing and of the casing below the packer. The ester solution is then injected into the cooled formation. It further cools the tubing and the bottom of the well. The acetic acid solution displaces the ester solution out into the formation where the ester slowly hydrolyzes to release formic acid which acidizes the formation at a great distance form the well. The acetic acid solution is displaced down the cooled tubing by water. Since the tubing and bottom of the well have been cooled by the initial batch of water and by the ester solution, the acetic acid solution does not present a serious corrosion problem in the tubing and bottom of the casing. The acetic acid is displaced out into the formation near the well and quickly acidizes this section of the formation where the highest permeability is desired. During the 24 hours while the well is shut-in, at least most of the ester is hydrolyzed. Some unhydrolyzed ester remains in the formation for several days slowly hydrolyzing and continuing to acidize the formation even while the well is being produced.

Many variations of the process steps and alternates to the chemicals described above will be apparent to those skilled in the art. For example, esters of acids, such as hydroxyacetic acid, can be used to treat formations containing high concentrations of calcium sulfate since this acid attacks not only calcium carbonate but calcium sulfate as well. Some acids, such as salicylic acid, in addition to those named above, form water-soluble esters and calcium salts. These can also be used in our process. Because of these and other alternates and variations obvious to those skilled in the art from the above description, we do not wish to be limited to the examples described, but only the following claims.

We claim:

1. A method for acidizing an oil-bearing earth formation penetrated by a well, the temperature of said formation being at least about 200° F., said method comprising injecting down said well and into said formation water and a liquid hydrocarbon solution of an ester of an organic carboxylic acid, said ester being soluble in water to the extent of at least about 5 grams in 100 milliliters of water at formation temperature, the calcium salt of which acid is water-soluble to the extent of at least about 2 grams in 100 milliliters of water at formation temperature, the concentration of said ester in said hydrocarbon solution being at least about 5 percent by volume.

2. The method of claim 1 in which the formation temperature is at least about 300° F.

3. The method of claim 1 in which at least some of said water is injected from said well into said formation ahead of said ester and at least some of said water is injected behind said ester.

4. The method of claim 3 in which at least a part of said water following said ester contains a free acid.

5. The method of claim 3 in which at least some of said water injected into said formation includes a water-soluble alcohol to improve the solubility of said ester in said water.

6. The method of claim 1 in which said ester is selected from the group consisting of methyl formate and ethyl acetate.

7. The method of claim 1 in which said well is shut-in for at least about an hour after injecting said ester into said formation, to permit hydrolysis of said ester in the formation, before returning said well to its usual operation.

8. The method of claim 1 in which the solvent in said hydrocarbon solution contains an aromatic hydrocarbon, whereby the ability of said solution to dissolve organic deposits is improved.

9. The method of claim 1 in which the solvent in said hydrocarbon solution is a petroleum fraction.

10. A method for acidizing an earth formation penetrated by a well, the temperature of said formation being at least about 200° F., said method comprising injecting down said well and into said formation water and an ester of an organic carboxylic acid, said ester being soluble in water to the extent of at least about 5 grams in 100 milliliters of water at formation temperature, the calcium salt of which acid is water-soluble to the extent of at least about 2 grams in 100 milliliters of water at formation temperature, at least some of said water being injected from said well into said formation ahead of said ester and at least some of said water being injected behind said ester, at least a part of said water following said ester containing free acid.

* * * * *